Figure 1:
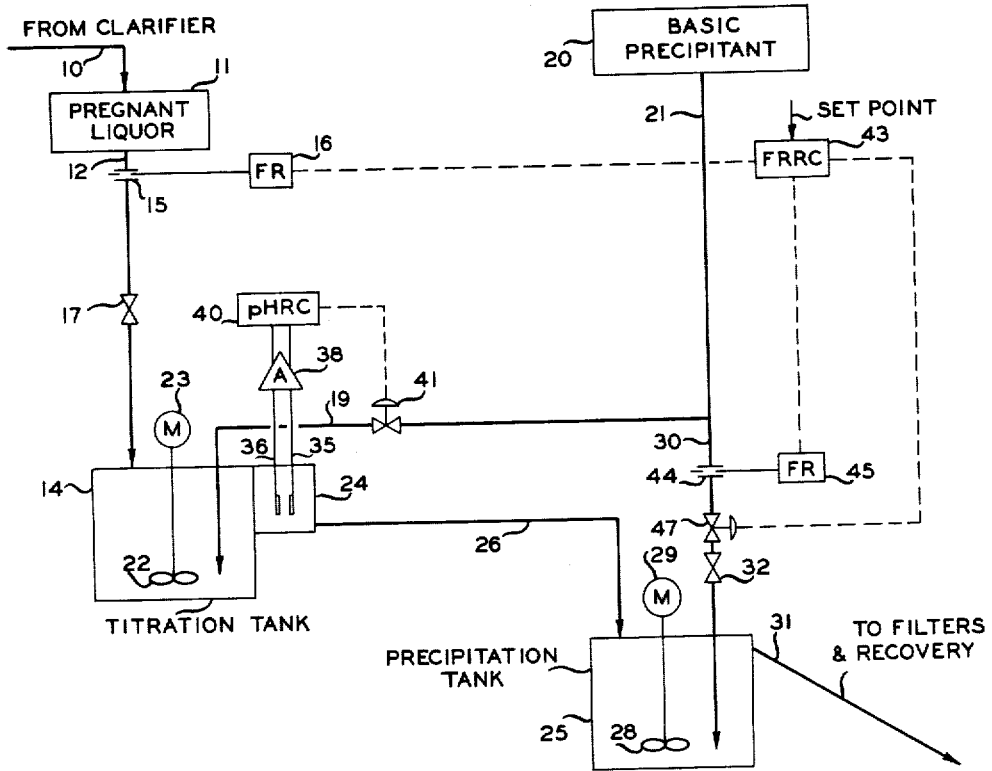

Sept. 24, 1963 J. L. HART ETAL 3,104,941
PROCESS FOR PRECIPITATION OF URANIUM FROM SOLUTION
Filed Oct. 26, 1959 2 Sheets-Sheet 1

INVENTORS
J. L. HART
R. A. KOBLE
BY Hudson and Young
ATTORNEYS

United States Patent Office 3,104,941
Patented Sept. 24, 1963

3,104,941
PROCESS FOR PRECIPITATION OF URANIUM FROM SOLUTION
James L. Hart and Robert A. Koble, Bartlesville, Okla., assignors to Phillips Petroleum Company, a corporation of Delaware
Filed Oct. 26, 1959, Ser. No. 848,782
18 Claims. (Cl. 23—14.5)

This invention relates to improvements in processes for uranium recovery by precipitation of the uranium values from a solution in which they have been dissolved.

One method of recovering uranium values from the ores in which they appear involves leaching the ore and subsequently recovering the uranium values from the liquor formed in leaching. When the ore has a high limestone content, the leaching is accomplished by contacting the ore with a carbonate leach solution in order to leach out the uranium values. Ores treated in this manner include but are not limited to carnotite, coffinite, uraninite and the like. This process is hereinafter termed the "carbonate leach process."

The carbonate leach process for extracting uranium values from ore briefly comprises wet grinding the crushed ore in the presence of sodium carbonate and sodium bicarbonate, oxidizing and leaching a resulting ore slurry containing about 50 percent solids to dissolve uranium values as the sodium uranyl tricarbonate complex to form a pregnant liquor that contains the uranium values, filtering the pregnant liquor to remove the tailings therefrom, clarifying the pregnant liquor after filtering, and thereafter precipitating the uranium from the pregnant liquor and recovering the uranium in the form of $U_3O_8$ from the precipitate. One of the methods for effecting the precipitation is to increase the pH until the uranium precipitates as sodium diuranate ($Na_2U_2O_7$). Ordinarily, filtering is employed to separate the precipitate from the liquid in which it appears. The filtrate recovered by this last step of filtering is called the barren liquor and contains some very small quantity of uranium values as well as other chemical values and is recycled for use in the process. Preferably, the barren liquor is recarbonated using carbon dioxide to regenerate the carbonate and bicarbonate values in solution.

According to the prior art, this precipitation step is carried out by adding a suitable material, such as sodium hydroxide, in one single step to the pregnant liquor. The amount added is sufficient to neutralize the bicarbonate solution and to precipitate the uranium values. However, the amounts of bicarbonate and uranium present in the pregnant liquor vary somewhat from time to time and therefore the prior art method sometimes results in incomplete precipitation and recovery of uranium, and at other times results in the use of too much hydroxide.

Accordingly, it is an object of our invention to provide an improved method of adding the precipitating agent to a solution having uranium values therein. More particularly, it is an object of our invention to provide an improved method in the carbonate leach process for adding the precipitating agent to a clarified pregnant liquor. Another object of our invention is to provide a method of automatically controlling the addition of a precipitating agent to solutions having uranium values therein, and in particular to automatically control such addition in the treatment of clarified pregnant liquors produced in the course of the carbonate leach process. Another object of our invention is to accomplish the foregoing objects to secure either or both of the advantages of reduced requirements for precipitating agents and increased recovery of uranium from the solution so treated.

In connection with accomplishing these objects it is a principal feature of our invention that the precipitating agent is added in two stages, with sufficient quantity being added in the first stage to substantially neutralize the bicarbonate ions in the pregnant liquor. At or near this point in the first stage (zero bicarbonate point), a small change in the amount of precipitating agent produces a very large change in the pH. In the second stage is added a sufficient quantity of precipitating agent to precipitate the uranium values from the solution.

Other objects, advantages and features of our invention will become apparent from the following description and the drawings appended thereto.

Figure 2:
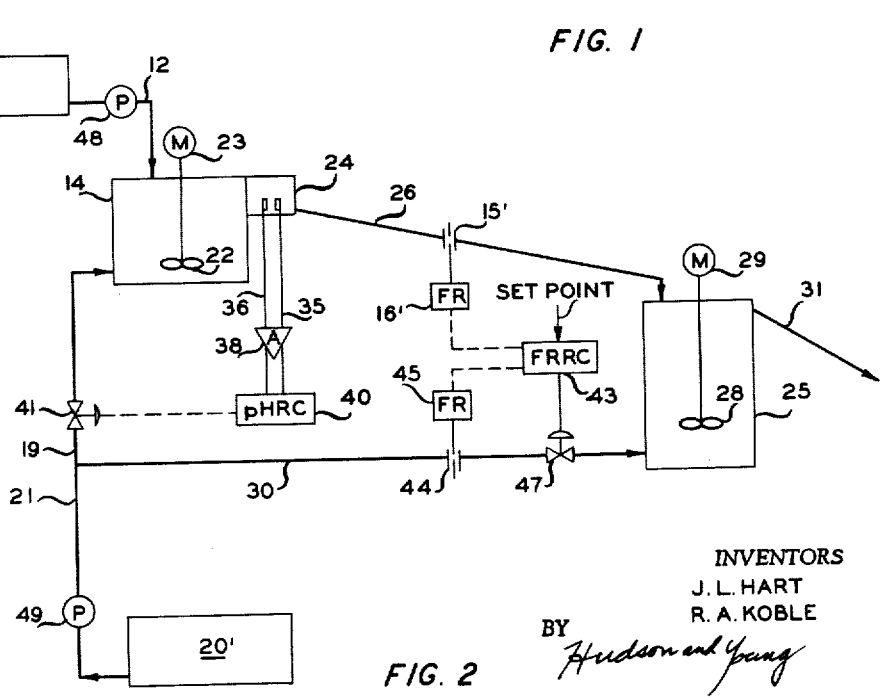
Figure 3:
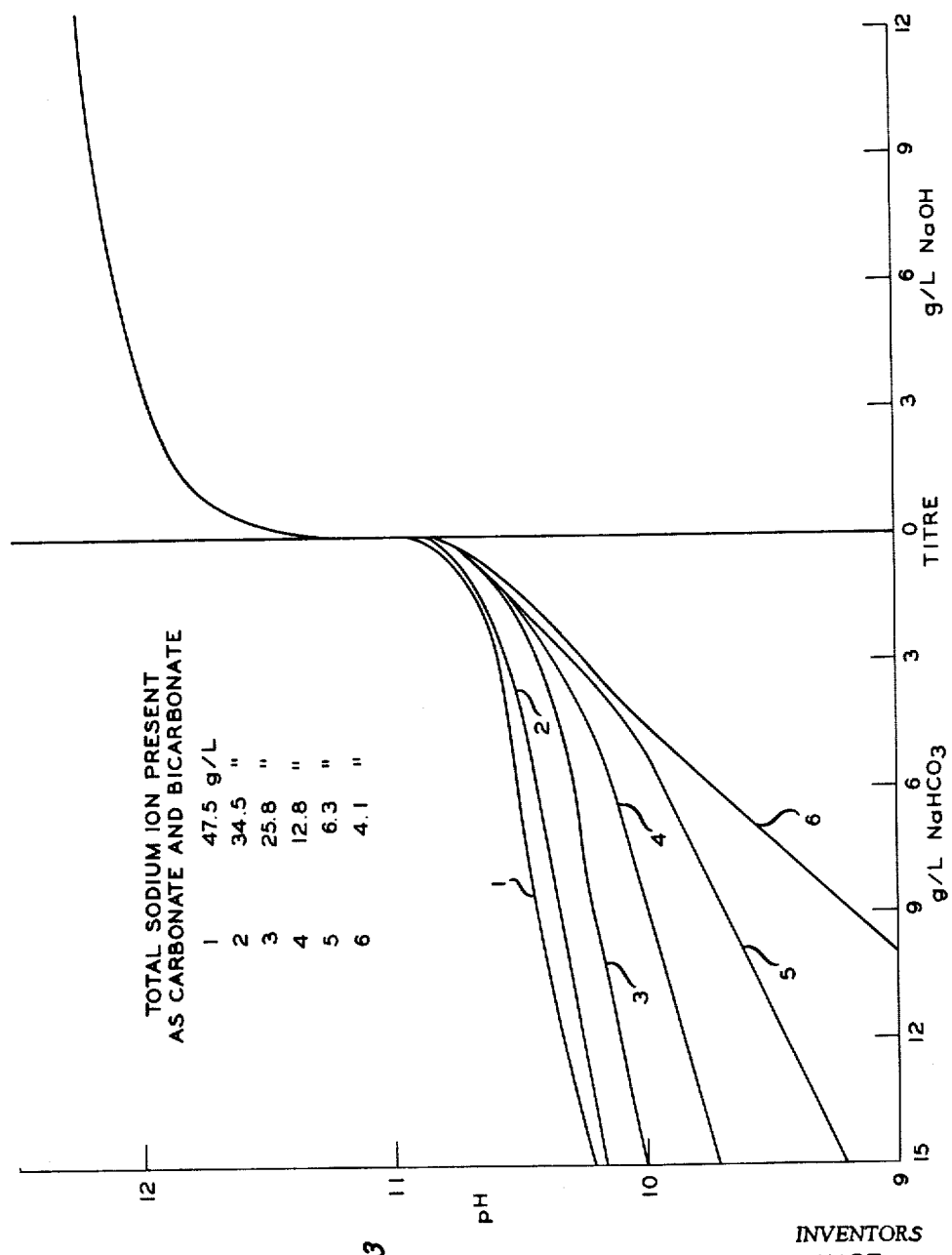

In the drawings:
FIGURE 1 is a schematic flow diagram of a preferred embodiment for the practice of our invention;
FIGURE 2 is a schematic diagram of another embodiment for the practice of our invention;
FIGURE 3 represents typical curves of the titre (abscissa) plotted against the pH (ordinate).

As previously mentioned, the principal feature of the invention involves the process of adding the precipitating agent in two stages. The addition to the first stage increases the pH of the solution treated up to a predetermined point. No precipitation takes place in the first stage. In the second stage there is added sufficient additional agent to cause precipitation. In both stages of adding the agent, thorough mixing and agitation of the mixture is carried out. Preferably, the invention is applied to the treatment of pregnant liquor as produced in the carbonate leach process. However, our invention can also be applied to the treatment of other liquid streams produced in the course of extracting uranium with the carbonate leach process.

The liquors are formed in the above-mentioned slurrying step by mixing an alkali metal carbonate with water and subsequently contacting uranium-containing ore therewith under oxidizing conditions. Normally, in leaching uranium values by the carbonate leach process, sodium carbonate and sodium bicarbonate are employed. However, while not as economical as the sodium compound, other alkali metal carbonates and bicarbonates (e.g. potassium, lithium, rubidium and cesium) can be employed.

The pregnant carbonate leach liquors from which the uranium values are precipitated by operating according to our invention will generally contain from 0.5 to 15 grams per liter of $U_3O_8$, usually from 2 to 3 grams per liter on the same basis. The uranium in these carbonate leach liquors is present as $Na_4UO_2(CO_3)_3$, but is normally expressed in terms of $U_3O_8$. The pregnant carbonate leach liquors are mixed with the precipitating agent at a temperature within the range extending from 50° F. to 200° F., preferably from 100° F. to 170° F., and more preferably from 130° F. to 150° F.

Precipitation is brought about by introducing an alkali metal hydroxide into the pregnant liquor. Although the alkali metal hydroxide may be added in solid form, it is preferred to add it as an aqueous solution. While sodium hydroxide (NaOH) is to be preferred in making up the aqueous solution, the hydroxides of the other alkali metals (potassium, lithium, rubidium, and cesium) can be employed for this purpose. The aqueous solution which is employed will normally contain from 10 to 75, preferably 20 to 60 percent by weight of alkali metal hydroxide and more preferably from 40 to 60 percent by weight. In the process of this invention, it is contemplated that the hydroxide of the same alkali metal as used in the leach step is employed to bring about the precipitation of uranium values from the leach liquors, i.e. sodium hydroxide is used to precipitate sodium carbonate leach solutions, potassium hydroxide is used to precipitate potassium carbonate leach solutions, and so forth.

In the leaching of uranium-containing ore by the carbonate leach process, the uranium content of the ore will vary, and wide variations in the ore to leach liquor ratio are possible. As a result, pregnant liquors containing from 0.5 to 15 grams per liter of $U_3O_8$ are obtained. To precipitate these uranium values from solution, it is necessary to neutralize the bicarbonate present and to provide excess alkali metal hydroxide. In the present process, depending upon the concentration of dissolved sodium uranyl tricarbonate in the leach liquor, the amount of sodium hydroxide, for example, required in excess of the zero bicarbonate point will be within the range between 2.0 and 20 grams per liter NaOH. The larger amounts of NaOH are required for more dilute $U_3O_8$ solutions and smaller amounts for the more concentrated solutions. A typical pregnant leach liquor containing from 2.5 to 2.75 grams per liter $U_3O_8$ requires an excess of 4.5 to 5.0 grams per liter NaOH in excess of the zero bicarbonate point for precipitation.

After the precipitation is accomplished, the liquor-precipitate mixture is then filtered and the uranium values are recovered from the filter cake.

FIGURE 1 shows a preferred embodiment of the invention wherein clarified liquor is received from a conduit 10 and delivered into a tank 11 for temporary storage. Although not shown, this liquor is received from the clarifier which is located upstream of the apparatus illustrated in both FIGURE 1 and FIGURE 2. The tank 11 is located physically above the subsequent tanks and vessels into which the pregnant liquor is directed so that gravity flow can take place. The pregnant liquor flows out of the tank 11 through a conduit 12 and is delivered into a titration tank 14. Flow measuring apparatus such as the orifice plate 15 and the flow recorder 16 are connected in conduit 12. A normally open manually operated valve 17 may also be disposed in this line, as an optional feature.

The titration tank 14 comprises the titration zone wherein the first portion of precipitating agent is added. For ease of explanation, it will be assumed that sodium hydroxide is employed as the precipitating agent. The sodium hydroxide is introduced into the titration tank from the conduit 19 which connects to tank 20 by means of the conduit 21. The tank 20 is located physically above these vessels in the system where sodium hydroxide is added to the uranium containing liquor, in order to achieve a gravity flow into these other tanks. An agitating means, such as impeller 22, driven by a motor 23, and supported by appropriate means (not shown) is disposed in the titration tank 14. The titration tank is of a relatively small volume so that it can cooperate with the impeller in order to facilitate a thorough mixing of the pregnant liquor with the hydroxide. In the preferred embodiment, the conduit 19 discharges the hydroxide at a region of high turbulence within the tank, such as the eye of the impeller 22.

While the above-mentioned alkali metal hydroxides are the preferred precipitating agents, it is also within the scope of this invention to employ the oxides and hydroxides of calcium and magnesium in the first (titration) stage. The alkali metal hydroxides are absolutely necessary in the final (precipitation) stage. If the oxides and hydroxides of calcium and magnesium are employed in the first stage, it is necessary to filter out undissolved and unreacted precipitating agents and precipitated carbonates between the first and second stages.

The admixture flows from titration tank 14 through a weir chamber 24, thence into the precipitation tank 25 through the conduit 26. Tank 25 may comprise one tank or a series of precipitation tanks, which in either case is a precipitation zone and is equipped with agitating means such as the impeller 28 and motor 29. The precipitating agent is introduced into 25 by means of conduits 21 and 30. It is preferred that the sodium hydroxide be introduced into region of high turbulence in the precipitation tank for substantially the same reasons set forth above with respect to tank 14. Manual valves, e.g. 32, normally open, are disposed where desired. Reaction products are withdrawn from the tank 25 by means of conduit 31 and circulated to filters (not shown) located downstream thereof. The uranium product is recovered from the filter cake in the subsequent processing.

An automatic control system is provided in order to perform the function of automatically controlling the addition of the precipitating agent to the pregnant liquor in the titration tank 14 and to the mixture in the precipitation tank 25. This system includes two control loops. The first control loop comprises the means for controlling the addition of caustic in the first stage by measuring the pH of the admixture withdrawn therefrom in order to produce the first control signal and then adjusting the rate at which the sodium hydroxide is added in the first stage responsive to the control signal. The second loop comprises a means for measuring the ratio of the rate at which pregnant liquor is introduced into the system to the rate at which sodium hydroxide is introduced into the precipitation tank in order to produce a control signal representative of the change required and then to adjust the rate at which the hydroxide is introduced into the second or precipitation stage responsive to this control signal. The first loop comprises a pair of electrodes 35, 36 disposed in the weir chamber 34 and connected through a combination of a computer and an amplifier 38 to a pH recorder controller 40. The computer-amplifier 38 is preferably an electronic device which responds to signals from the electrodes 35 and 36 by producing the antilogarithm of the pH represented by such signals. An electronic system suitable for this purpose disclosed in Rev. Sci. Instr., 21:179–181 (1950) and is referred to in Soroka "Analog Methods in Computations and Simulation" (McGraw-Hill, New York, 1954), pages 66–67. The reason for providing this feature is so that the controller 40 can provide a linear response that is appropriate to the pH that is detected by the electrodes 35 and 36. The linearized pneumatic output signal produced by the pH recorder controller 40 is then transmitted to a motor valve 41 to adjust the amount of precipitating agent introduced in the first stage.

The second control loop includes the flow measuring apparatus measuring the flow of the pregnant liquor, elements 15 and 16. A pneumatic output signal from 15 and 16 is provided to a flow ratio recorder controller 43 as one of the input signals thereto. A similar flow measuring device comprising the orifice plate 44 and the flow recorder 45 determines the flow of precipitating agent into the second stage (precipitation tank 25) and transmits a pneumatic output signal from 45 to the ratio controller 43 as a second input signal for the latter. A pneumatic control signal is produced by 43 and is transmitted to motor valve 47 to adjust the flow of caustic into the second stage.

FIGURE 2 is generally similar to FIGURE 1 and similar apparatus is denoted by like reference numerals. The main difference is that the flow of the titre liquor withdrawn from the titration tank 14 is measured by the flow measuring apparatus 15' and 16' in order to provide one of the input signals to the ratio controller 43. This flow measurement is taken instead of the flow out of the tank 11' as in FIGURE 1. Manual valves, optional features, are not shown here. The other differences here are that the tanks 11' and 20' are not disposed for gravity flow, and therefore pumps 48 and 49, respectively, provide the means for withdrawing the various liquids from the two tanks and delivering them to their respective destinations. Because of the modifications of the apparatus in this figure, primed numbers are used to denote those elements serving substantially the same function but which have been altered in the manner described in this paragraph.

Constructions of suitable pH and flow measuring means, recorder-controllers, and the like are shown in Considine, "Process Instruments and Control Handbook," McGraw-Hill (New York), 1957.

The phenomenon set forth in FIGURE 3 facilitates an understanding of the cooperation between the two control loops and of the reason for adding the precipitating agent in two distinct stages. This figure shows that for a given solution an "S-shaped" curve is produced as it moves from the excess bicarbonate state to the more basic state of excess caustic. This curve is made by studies on carbonate leach process pregnant liquors. It shows that at the zero bicarbonate point (denoted by the titre value of 0) there is an inflection point disposed in the curve. It also shows in the region of this inflection point, from pH values of 10.8 to 11.7, a very great change in pH is accomplished by a very small change in titre. Translated to the terms of our invention, this curve demonstrates that a very small addition of hydroxide will give a very great change in pH in the neighborhood of the zero bicarbonate point. A pH controller can, by being limited to controlling in the inflection point region, operate at an optimum or maximum sensitivity. It is for this reason that the pH is controlled at this particular range of values in the titration zone represented by the tank 14. A very sensitive and accurate control is thus achieved in the first stage.

In FIGURE 3, a number of curves are plotted which contain different amounts of sodium carbonate and sodium bicarbonate. That is, both the total of carbonate and bicarbonate vary, and the ratio of carbonate to bicarbonate varies. Since these curves converge at the zero bicarbonate point, it can be seen that by limiting the set point of the first loop to near the zero bicarbonate point, the control problems in determining total sodium ion concentration and carbonate/bicarbonate ratio are eliminated, while gaining improved sensitivity to pH change.

Experience has shown precipitation does not occur until the pH reaches a value of at least 11.8, and with the solutions of FIGURE 3, at a pH of approximately 12.2. Higher values than 12.2 may be required in order to precipitate a sufficient quantity of the uranium values. Since the pH is relatively insensitive to changes in the alkali metal hydroxide content in this region of precipitation, the second control loop does not rely on measurement of the pH but instead relies on a controlled ratio of flow. This ratio is that of the flow of liquid through line 30 to the flow through either one of lines 12 or 26, or vice versa. With this control arrangement, the maximum sensitivity is realized in controlling the first stage and the optimum accuracy of control is realized in the second stage. To demonstrate the superiority of the present process in more accurately controlling the addition of excess NaOH over methods employing pH alone, it should be pointed out that the pH changes only from 12.2 to 12.23 in going from 10 g./l. excess NaOH to 28.8 g./l. excess NaOH. It is to be understood that the curves in FIGURE 3 are representative and that the positions of these curves can vary vertically and/or laterally with the temperature at which the reaction is carried out, the concentration of the uranium values and/or the impurities in the pregnant liquor, and the concentration of the sodium ions in solution produced in the respective titration and precipitation zones. It is to be further understood that such variation is not substantial and that in any event the zero bicarbonate point is located in the pH range from 10.8 to 11.7.

In starting up the system appropriate set points are selected for the respective controllers 40 and 43. In one embodiment, the respective controllers are adjusted for set point values representing a pH of 11.0 and a ratio of 0.01 gallon of 50 weight percent aqueous NaOH per gallon of pregnant liquor. The latter ratio is selected to produce a solution having at least 4 grams per liter of excess sodium hydroxide.

Once the controllers are adjusted, the system is started up and operated until the solution in titration tank 14 is brought near or to its control (set) point. The system is operated manually until this is accomplished. Once this condition is reached, the system is then switched to automatic control. Then, the pH of the solution is measured as it leaves the titration tank through the weir chamber 24. The quiescent conditions in the weir chamber promote accuracy of measurement by the pH electrodes and their associated apparatus. An electrical signal representative of the pH is produced at the electrodes, is "linearized" in 38, then is fed into recorder controller 40 where it is compared with a signal representing the set point, and from the comparison a control signal is produced. This control signal, sometimes termed an error signal, normally represents the difference between the measured, linearized pH and the set point. It is transmitted to the motor valve 41 and produces an adjustment in the flow of the caustic into the titration tank 14. This adjustment is commensurate with the direction and magnitude of the difference between the set point and the measured value of the pH.

In similar fashion, the second stage is manually brought to its control point and the controller 43 is then put on stream. The flow controller receives flow measurements from the respective apparatuses 15 and 16 (or 15' and 16') and 44, 45 and by determining the ratio between these two rates of flow and then comparing it with the set point of the ratio controller, a ratio control signal is produced. This control signal is then transmitted to the motor valve 47 which makes the requisite adjustment in the amount of alkali metal hydroxide that flows into the tank 25 per unit time.

By way of further explanation, when the pH of the mixture in 24 is above the set point, the pH controller 40 operates to reduce the flow in line 19 by means of valve 41; an opposite reaction is produced if the pH of this stream is below the set point. The ratio controller operates to increase the flow in line 30 by means of motor valve 47 if the ratio of the pregnant liquor flow rate to the precipitating agent flow rate is above the ratio set point.

The following example will further illustrate the practice of my invention:

*Example*

In a commercial plant wherein uranium-containing ore is leached with carbonate-bicarbonate leach solution, the rate of flow of clarified pregnant leach liquor to the precipitation unit is 180 gallons per minute of solution containing 2.76 grams/liter (0.00161 pound/gallon) of $U_3O_8$. The pH of this solution is 9.6, and the solution contains 15 grams per liter $NaHCO_3$ and 40 grams per liter $Na_2CO_3$. This temperature of the solution is 130 F. This solution is then admixed with 50% by weight aqueous sodium hydroxide which is admitted through a line in which is mounted a diaphragm motor valve. This valve is controlled by a pH recorder controller measuring the pH of the solution after sodium hydroxide addition. The set point of the pH controller is 11.6. The rate of sodium hydroxide addition to achieve this pH is approximately 1.70 gallons of 50% by weight aqueous NaOH per minute.

The solution of 11.6 pH is then admixed with additional 50% by weight aqueous NaOH as controlled by a ratio flow controller receiving responses from orifices mounted in both the 11.6 pH solution line and the caustic line (e.g., FIGURE 2). Based on the flow rate of 181.7 gallons per minute of the mixture, the ratio flow controller adjusts the addition of NaOH to approximately 1.20 gallons per minute of 50% by weight aqueous sodium hydroxide. This provides a five gram per liter excess of sodium hydroxide and causes the precipitation of sodium diuranate in an easily filterable form.

In a plant where the throughput is 2000 tons per day of ore that is treated by the carbonate leach process, a reduction in sodium hydroxide requirements of at least 3 tons per day is achieved by our invention when compared with one prior art control system. This particular prior art control system employed identical solutions, the hydroxide was added in a single stage, and the liquid streams were controlled by flow rate controllers.

From the foregoing description and appended drawings it should be apparent that we have provided a novel and useful invention for the carbonate leach process that comprises adding the precipitation agent in two steps. Other features of this invention comprises automatically controlling the amount of sodium hydroxide added to the pregnant liquor in the first stage to increase the pH to a value in the general vicinity of the zero carbonate point, e.g. 10.8 to 11.7. Another feature is automatically controlling the rate at which caustic is added in the second stage by the employment of a ratio flow controller which operates in response to the ratio of either the rate at which pregnant liquor is supplied to the first stage or to the rate of flow of solution into the second stage, to the rate of flow of the caustic into the second stage of addition.

While we have described our invention with respect to certain specific embodiments, reagents and the like, it is not our intention to be limited to those specific mean which have been described. It is our intention to include as our invention all the subject matter as disclosed herein and also to include as our invention those modifications thereof which will be obvious to one skilled in the art. One example of these modifications would be to employ a completely electric control system, using electric recorders and electric recorder controllers.

We claim as our invention:

1. An improved process for precipitating uranium values from a clarified pregnant liquor formed by leaching an ore with a carbonate leach solution, said process comprising feeding a stream of clarified pregnant liquor at a first rate of flow to a titration zone; feeding a stream of aqueous sodium hydroxide at a second rate of flow to said titration zone; mixing said hydroxide with said liquor in said zone to form a mixture having a pH in the range from 10.8 to 11.7; measuring the pH of said mixture and comparing it with a preselected pH in said range to produce a control signal representative of the change in the rate of said feeding of hydroxide to produce a mixture of said preselected pH; changing said second rate of flow in response to said control signal; at a third rate of flow, withdrawing said mixture from said zone and directing it to a precipitation zone; adding another stream of said aqueous sodium hydroxide to said mixture in said precipitation zone at a fourth rate of flow and in a sufficient quantity to precipitate the major portion of the uranium values upon the completion of the next-said mixing step; mixing said another stream of hydroxide with said mixture; measuring the ratio of said third rate of flow to said fourth rate of flow and producing a ratio control signal by comparing said ratio with a preselected ratio; and changing said fourth rate of flow in response to said ratio control signal.

2. A process according to claim 1 further comprising maintaining the temperature in said titration zone and in said precipitation zone in the range extending from 100° F. to 170° F.

3. A process according to claim 1 further comprising maintaining the temperature in said titration zone and in said precipitation zone in the range extending from 130° F. to 150° F.

4. A process according to claim 1 wherein both streams of aqueous sodium hydroxide contain from 40 to 60 percent by weight of sodium hydroxide.

5. An improved process for precipitating uranium values from a clarified pregnant liquor formed by leaching an ore with a carbonate leach solution, said process comprising feeding a stream of clarified pregnant liquor at a first rate of flow to a titration zone; feeding a stream of aqueous sodium hydroxide at a second rate of flow to said titration zone; mixing said hydroxide with said liquor in said zone to form a mixture having a pH in the range from 10.8 to 11.7; measuring the pH of said mixture and in response thereto producing a control signal representative of the change in the rate of said feeding of said hydroxide to produce a mixture of a preselected pH; changing said second rate of flow in response to said control signal; at a third rate of flow, withdrawing said mixture from said zone and directing it to a precipitation zone; adding a second stream of said aqueous sodium hydroxide to said mixture in said precipitation zone at a fourth rate of flow and in a sufficient quantity to precipitate the major portion of the uranium values upon the completion of the next-said mixing step; mixing said second stream of hydroxide with said mixture; measuring the ratio of said first rate of flow to said fourth rate of flow and producing another control signal by comparing said ratio with a preselected ratio; and changing said fourth rate of flow in response to said another control signal.

6. A processing according to claim 5 further comparing maintaining the temperature in said titration zone and in said precipitation zone in the range extending from 100° F. to 170° F.

7. A process according to claim 5 further comprising maintain the temperature in said titration zone and in said precipitation zone in the range extending from 130° F. to 150° F.

8. A process according to claim 1 wherein both streams of aqueous sodium hydroxide contain from 40 to 60 percent by weight of sodium hydroxide.

9. An improved process for precipitating uranium values from a clarified pregnant liquor formed by leaching an ore with a carbonate leach solution said process comprising feeding a stream of clarified pregnant liquor at a first rate of flow to a titration zone; feeding a stream of an alkali metal hydroxide at a second rate of flow to said titration zone; mixing said hydroxide with said liquor in said zone to form a mixture having a pH in the range from 10.8 to 11.7; measuring the pH of said mixture and comparing it with a preselected pH in said range to produce a control signal representative of the change in the rate of said feeding of said hydroxide to produce a mixture of said preselected pH; changing said second rate of flow in response to said control signal; at a third rate of flow, withdrawing said mixture from said zone and directing it to a precipitation zone; adding another stream of an alkali metal hydroxide to said mixture in said precipitation zone at a fourth rate of flow and in a sufficient quantity to precipitate the major portion of the uranium values; measuring the ratio of one of said first and third rates of flow to said fourth rate of flow and producing another control signal by comparing said ratio with a preselected ratio; and changing said fourth rate of flow in response to said another control signal.

10. A process according to claim 9 further comprising maintaining the temperature in said titration zone and in said precipitation zone in the range extending from 100° F. to 170° F.

11. A process according to claim 9 further comprising maintaining the temperature in said titration zone and in said precipitation zone in the range extending from 130° F. to 150° F.

12. A process according to claim 9 wherein both streams of aqueous hydroxide consist essentially of the same alkali metal hydroxides.

13. A process according to claim 9 wherein both streams of aqueous hydroxide contain from 40 to 60 percent by weight of hydroxide.

14. An improved process for precipitating uranium values from a clarified pregnant liquor formed by leaching an ore with a carbonate leach solution, said process comprising feeding a stream of clarified pregnant liquor containing uranium values from 0.5 to 15 grams per liter expressed as $U_3O_8$ at a first rate of flow to a titration zone; feeding an aqueous solution containing 20 to 60 weight percent alkali metal hydroxide at a second rate of flow to said titration zone to form a mixture having a pH in the range from 10.8 to 11.7; measuring the pH of said mixture and comparing it with a preselected pH in said range to produce a control signal representative of the change in the rate of said feeding of aqueous solution to produce a mixture of said preselected pH; changing said second rate of flow in response to said control signal; at a third rate of flow, withdrawing said mixture from said zone and directing it to a precipitation zone; adding another stream of said aqueous solution to said mixture in said precipitation zone at a fourth rate of flow and in a sufficient quantity to precipitate the major portion of the uranium values; measuring the ratio of said second rate of flow to one of said first and third rates of flow and producing another control signal by comparing said ratio with a preselected ratio; changing said fourth rate of flow in response to said another control signal; and maintaining a temperature in the range extending from 130° F. to 150° F. during the steps from the first-said feeding step to said changing step.

15. An improved process for precipitating uranium values from a clarified pregnant liquor formed by leaching an ore with a solution that comprises the carbonate and bicarbonate of a least one member selected from the group consisting of alkali metals, said process comprising feeding a stream of clarified pregnant liquor at a first rate of flow to a titration zone; feeding a second stream of a hydroxide of at least one member selected from the group consisting of sodium, potassium, lithium, rubidium, cesium, calcium, and magnesium at a second rate of flow to said titration zone; mixing said second stream with said liquor in said zone to form a mixture having a pH in the range from 10.8 to 11.7; measuring the pH of said mixture and in response thereto producing a control signal representative of the change in the rate of said feeding of said second stream to produce a mixture of said preselected pH; changing said second rate of flow in response to said control signal; at a third rate of flow, withdrawing said mixture from said zone and directing it to a precipitation zone; adding another stream of a hydroxide of at least one member selected from said group consisting of alkali metals to the mixture in said precipitation zone at a fourth rate of flow and in a sufficient quantity to precipitate the major portion of the uranium values; measuring the ratio of one of said first and third rates of flow to said fourth rate of flow and producing another control signal by comparing said ratio with a preselected ratio; and changing said fourth rate of flow in response to said another control signal.

16. A method according to claim 15 wherein said solution comprises one selected from said group and the same member is selected from said group in the second-said feeding step and said adding step.

17. In the carbonate leach process for recovering uranium values from a clarified pregnant solution by the addition of a precipitating agent to said solution, the improvement comprising adding said agent to said solution in first and second stages; automatically controlling the adding in said first stage by measuring the pH of the admixture with a pH controller to produce a first control signal and adjusting the rate at which said agent is added in said first stage responsive to said first control signal; and automatically controlling the adding in second stage by measuring with a ratio controller the ratio of the rate at which said solution is fed into said first stage to the rate at which said agent is added in said second stage to produce a second control signal and adjusting the rate at which said agent is added in said second stage in response to said second control signal.

18. In the carbonate leach process for recovering uranium values from a clarified pregnant solution by the addition of a precipitating agent to said solution, the improvement comprising adding said agent to said solution in first and second stages, to form respectively, an admixture and a precipitate; automatically controlling the adding in said first stage by measuring the pH of the admixture with a pH controller to produce a first control signal and adjusting the rate at which said agent is added in said first stage responsive to said first control signal; and automatically controlling the adding in said second stage by measuring with a ratio controller the ratio of the rate at which said admixture is fed into said second stage to the rate at which said agent is added in second stage to produce a second control signal and adjusting the rate at which said agent is added in said second stage in response to said second control signal.

References Cited in the file of this patent

UNITED STATES PATENTS

| | | |
|---|---|---|
| 1,450,023 | Edelman | Mar. 27, 1923 |
| 1,945,611 | Knight et al. | Feb. 6, 1934 |
| 2,466,118 | Miller | Apr. 5, 1949 |
| 2,702,238 | Hays | Feb. 15, 1955 |
| 2,779,657 | Ballard | Jan. 29, 1957 |
| 2,813,003 | Thunaes et al. | Nov. 12, 1957 |
| 2,841,468 | Wilson | June 1, 1958 |
| 2,897,048 | Stevenson | July 28, 1959 |

OTHER REFERENCES

Brown et al.; "Chem. Eng. Progress Symposium Series," vol. 50, No. 13, pages 5–10 (1954).

UNITED STATES PATENT OFFICE
CERTIFICATE OF CORRECTION

Patent No. 3,104,941                      September 24, 1963

James L. Hart et al.

It is hereby certified that error appears in the above numbered patent requiring correction and that the said Letters Patent should read as corrected below.

Column 8, lines 27 and 28, for "comparing" read -- comprising --; line 32, for "maintain" read -- maintaining --; line 35, for the claim reference numeral "1" read -- 5 --.

Signed and sealed this 21st day of April 1964.

(SEAL)
Attest:

ERNEST W. SWIDER

Attesting Officer

EDWARD J. BRENNER

Commissioner of Patents